United States Patent [19]

Ross

[11] 4,080,809
[45] Mar. 28, 1978

[54] CASTER BRAKE CONTROL SYSTEM

[75] Inventor: Frank E. Ross, Newton, Iowa

[73] Assignee: The Maytag Company, Newton, Iowa

[21] Appl. No.: 804,872

[22] Filed: Jun. 9, 1977

[51] Int. Cl.² ............................................. D06F 39/00
[52] U.S. Cl. ................................... 68/12 R; 16/35 R;
68/13 R; 68/23 R; 210/143; 233/1 B; 280/79.1 R; 312/253
[58] Field of Search ................... 68/3 R, 12 R, 13 R, 68/23 R, 23.1, 23.3, 24, 212; 312/253, 71; 248/25; 210/143; 233/1 B; 134/115 R; 16/35 R; 188/1 D; 280/79.1 R

[56] References Cited

U.S. PATENT DOCUMENTS

| 2,096,229 | 10/1937 | Dudley | 16/35 R |
|---|---|---|---|
| 2,389,774 | 11/1945 | Haberstump | 68/24 X |
| 2,709,828 | 6/1955 | Noelting et al. | 16/35 R |
| 2,735,130 | 2/1956 | Unsworth | 16/33 |
| 2,783,055 | 2/1957 | Michaud | 280/43.14 |
| 3,356,384 | 12/1967 | Dupeux | 280/62 |
| 3,635,491 | 1/1972 | Drews et al. | 280/43.14 |
| 3,884,493 | 5/1975 | Weir et al. | 280/79.1 R |

Primary Examiner—Philip R. Coe
Attorney, Agent, or Firm—Richard L. Ward

[57] ABSTRACT

A manually operable caster brake control system for a portable apparatus such as an automatic washing machine. The brake control system is connected through a linkage system to an access door and a line switch such that the apparatus will not operate unless the caster brake is actuated and the access door is closed.

13 Claims, 9 Drawing Figures

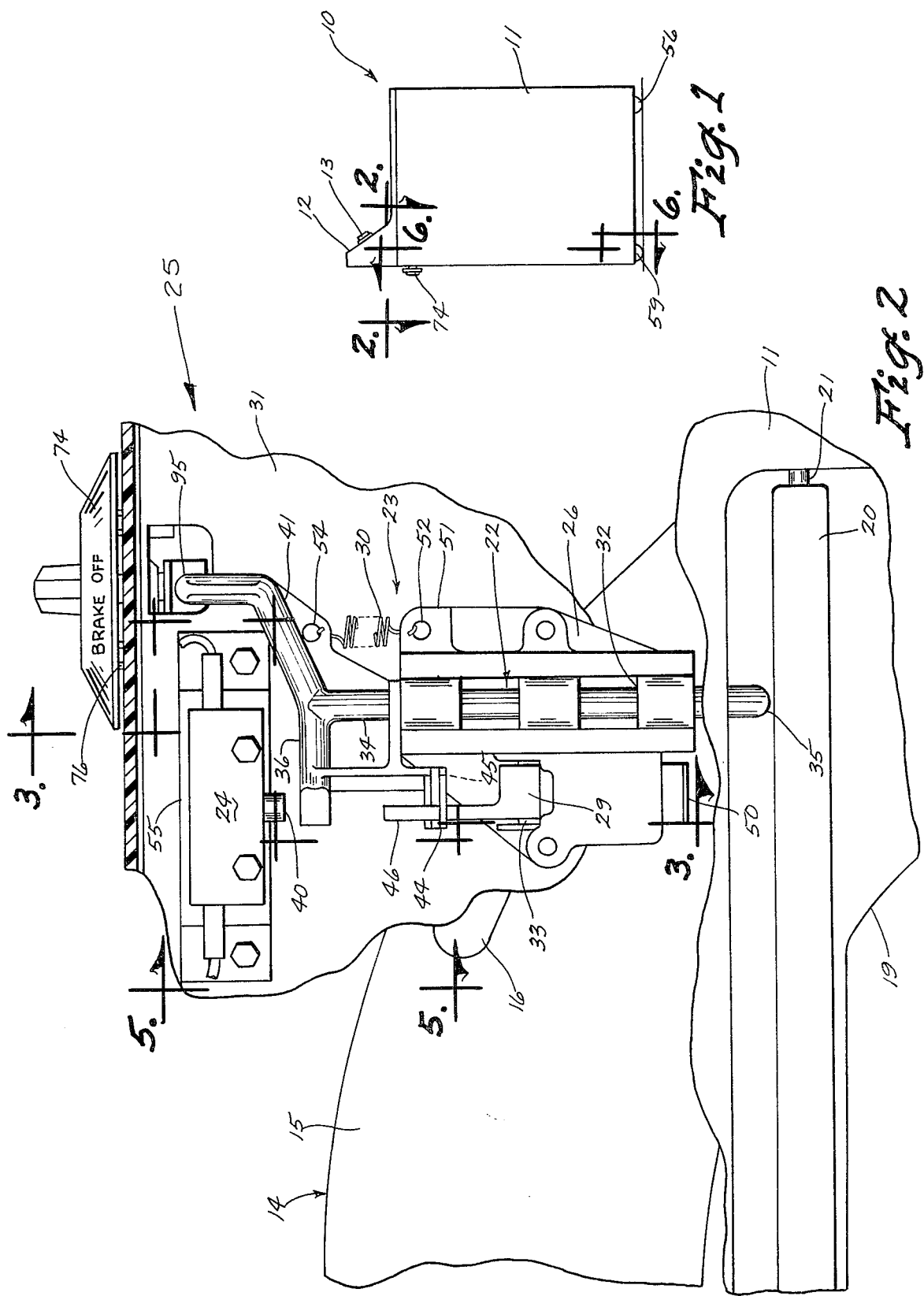

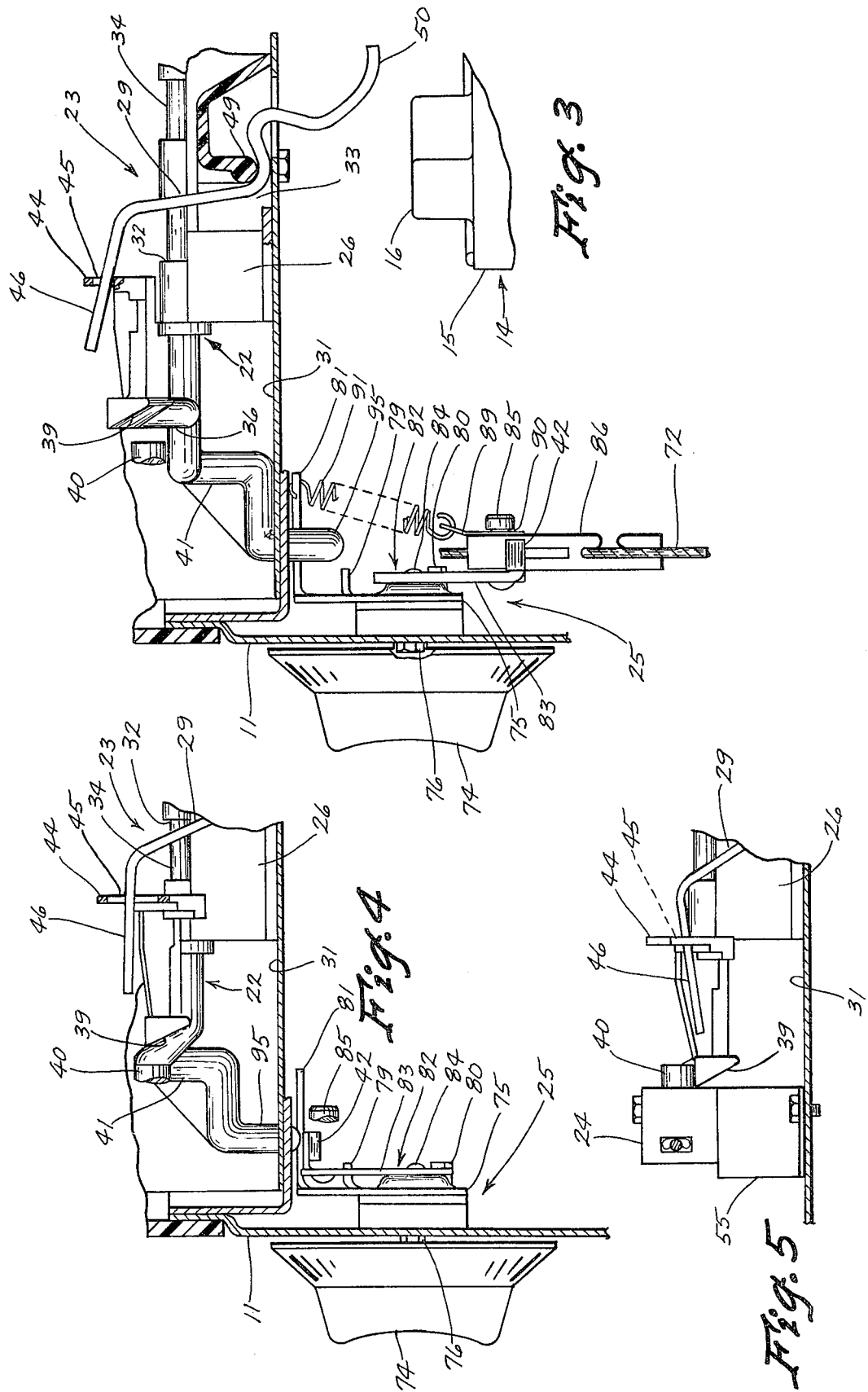

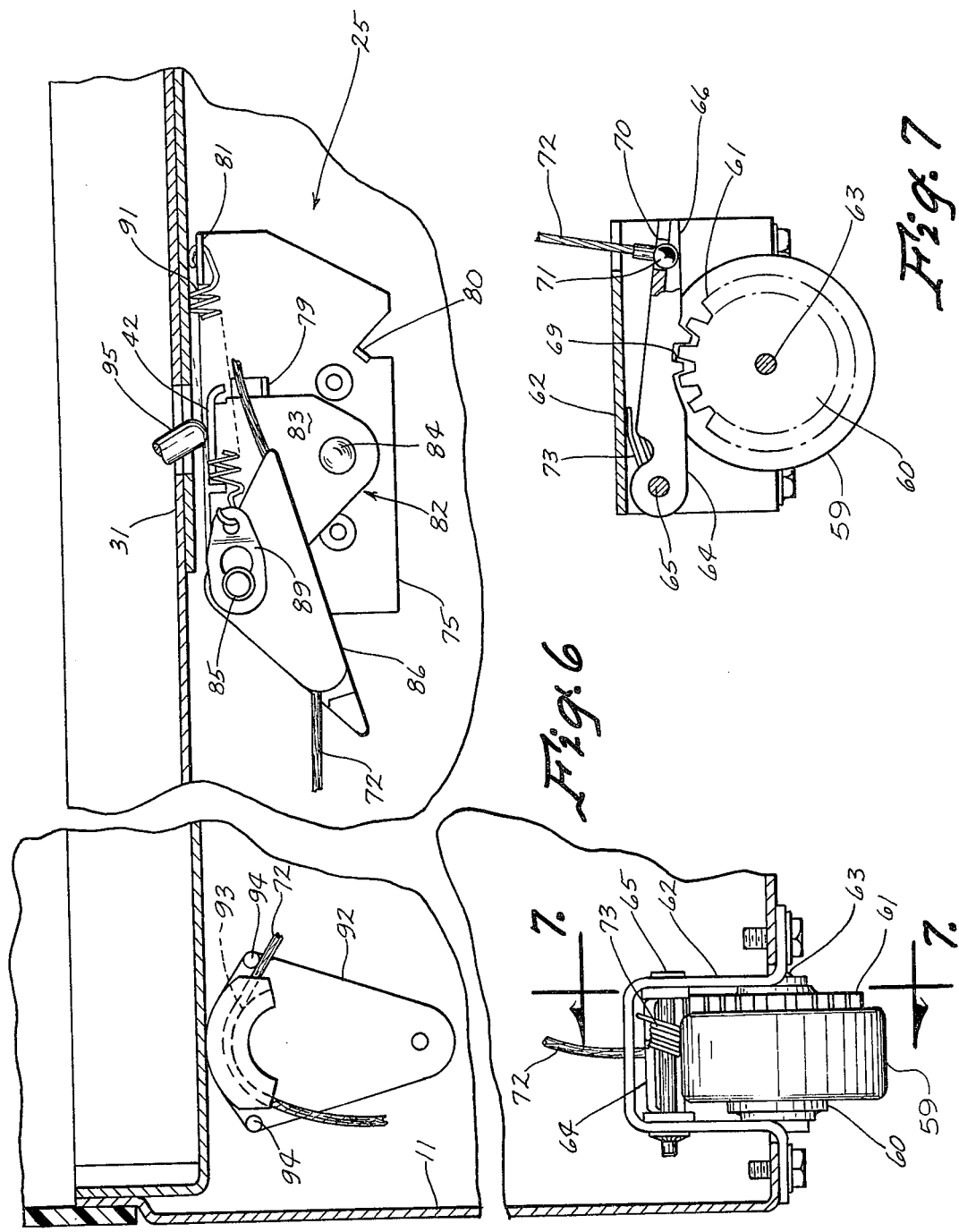

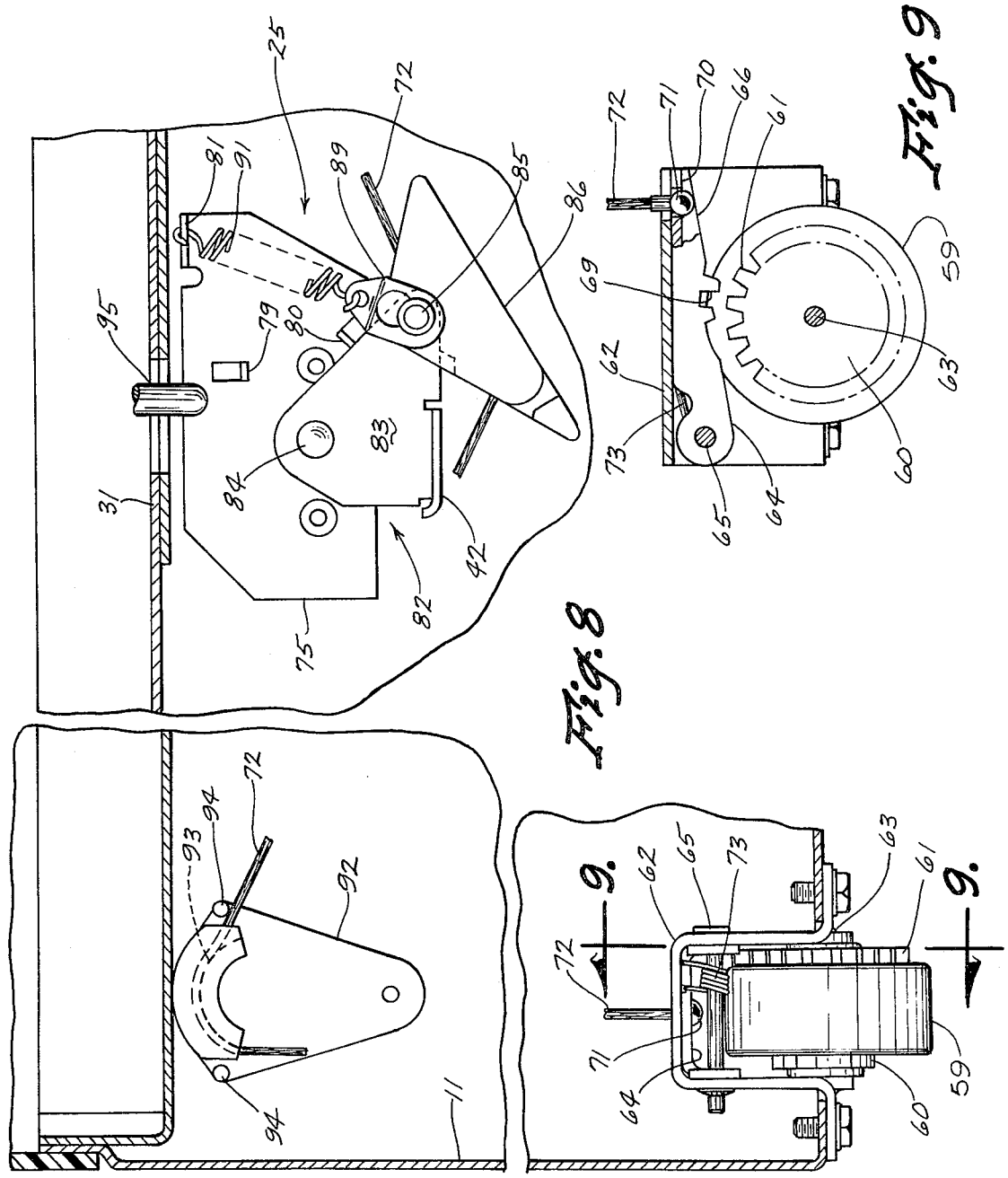

CASTER BRAKE CONTROL SYSTEM

BACKGROUND OF THE INVENTION

1. Field of the Invention

This invention relates to a caster brake control system and more particularly to a manually operable brake control system combined with a switch actuating mechanism, and in a specific embodiment with an unbalance sensing mechanism, for a portable washing apparatus. Means are provided to prevent operation of the machine unless the caster brake is engaged and the access door is closed.

2. Description of the Prior Art

A portable apparatus such as a washing machine, is subject to movement due to reaction torque during periods of braking, heavy agitation, or high speed spinning. It has been suggested in Haberstump U.S. Pat. No. 2,389,774 that a mechanism be provided by which feet are forced against the floor to raise the front casters from the floor and prevent the washing machine from moving. In Haberstump, there is no connection of the mechanism with the electrical control system of the washing machine.

In Michaud U.S. Pat. No. 2,783,055, a mechanical linkage is provided through which the machine can be lowered onto permanent legs once it has been rolled into position for washing.

Dupeux U.S. Pat. No. 3,356,384 describes a machine having three wheels. Two of these wheels operate as a pair and are mounted such that the wheel axes are at an obtuse angle with respect to each other. Also, at least one of the wheels is elliptical in shape. This combination prevents movement of the machine when subjected to the conditions of braking or high speed spinning.

Drews U.S. Pat. No. 3,635,491 teaches a foot-operated caster jack mechanism to raise the machine onto casters for moving and to lower the machine onto permanent mounting legs for stationary operation.

Weir et al U.S. Pat. No. 3,884,493 proposes four like casters with a first pair mounted substantially vertically and the second pair mounted at an angle to the vertical. Thus Weir proposes that the first pair will swivel and the second pair will not and that this nonswivelling action of the second pair will prevent movement while the machine is spinning and/or braking.

It is therefore apparent that various methods for solving the problem of machine movement during spinning or braking operations have been shown in the prior art. However, none of the known prior art has disclosed a brake control system which is incorporated into the electrical control system to render the apparatus inoperable unless the brake is activated and the access door is closed.

SUMMARY OF THE INVENTION

It is therefore an object of the instant invention to provide an improved manually operated caster brake control system.

it is a further object of the instant invention to provide coupling linkage between the access door, the line switch and the brake control.

It is a still further object of the invention to preclude operation of the apparatus unless the caster brake is actuated and the access door is closed.

Briefly, the instant invention achieves these objects in a manually engageable caster brake control system for a rotatable apparatus which includes mechanical actuating linkages associated with the access door, a switch controlling the apparatus, and the caster brake control.

Operation of the device and further objects and advantages thereof will become evident as the description proceeds and from an examination of the accompanying four pages of drawings.

BRIEF DESCRIPTION OF THE DRAWINGS

The drawings illustrate a preferrred embodiment of the invention with similar numerals to similar parts throughout the several views, wherein:

FIG. 1 is a side view of a portable automatic washing machine;

FIG. 2 is a fragmentary section view taken through the control panel generally along lines 2—2 of FIG. 1;

FIG. 3 is a view taken generally along lines 3—3 of FIG. 2 showing the actuator mechanism in the "brake off" position;

FIG. 4 is a view similar to FIG. 3 showing the actuator mechanism in the "brake on" position;

FIG. 5 is a view taken generally along lines 5—5 of FIG. 2 showing the actuator mechanism in the unbalance position;

FIG. 6 is a fragmentary view taken generally along lines 6—6 of FIG. 1 showing the brake mechanism in the "brake on" position;

FIG. 7 is a sectional view taken along lines 7—7 of FIG. 6 showing the brake arm teeth engaged with the cogs of the caster wheel hub;

FIG. 8 is a fragmentary view similar to FIG. 6 showing the brake mechanism in the "brake off" position; and FIG. 9 is a view similar to FIG. 7 and taken along lines 9—9 of FIG. 8 showing the brake arm teeth disengaged from the cogs of the caster wheel hub.

DESCRIPTION OF A PREFERRED EMBODIMENT

Referring now to the drawings, there is shown in FIG. 1 a side view of a portable automatic washing machine 10 including a cabinet 11. The cabinet 11 further includes a control panel 12 accommodating various control members such as sequential control means or timer actuatable by a dial 13.

Mounted within the cabinet 11, as in FIG. 2, is a resiliently supported tub assembly 14 within which is journalled a rotatable fabric basket. Mounted within the fabric basket is an agitator (not shown) which mechanically moves fabrics and fluid within the basket. The tub assembly 14 includes a tub top cover 15 on which is fixed a bumper 16 that moves with the tub assembly 14 and tub top cover 15. The position of the bumper 16 with respect to the cabinet 11 therefore is determined by the gyration of the tub assembly 14 when the washing machine 10 is energized in the extraction part of the series of operations.

The structure of the cabinet 11 includes an access opening 19 through which fabrics may be inserted into or removed from the rotatable fabric basket. The access opening 19 is closed by an access door 20. The access door 20 is pivoted about a fulcrum 21 spaced a short distance from the rear end of the door 20. The rear end of the door 20 functions as a lever with respect to the fulcrum 21 for engaging the spherical nose 35 of the line switch plunger 22.

Referring to FIG. 2, there is shown an actuator mechanism 23 which provides connecting linkage between the access door 20 and the line switch 24. This actuator mechanism 23 also provides linkage between the bumper 16 on the fabric basket and line switch 24 for unbalance control and interconnects the access door 20 with a caster brake control 25 and the line switch 24. Both of these functions will be further discussed hereinbelow.

The actuator mechanism 23 consists of four components; a mounting bracket 26, a line switch plunger 22, an unbalance lever 29 and a biasing spring 30. The generally rectangular mounting bracket 26 is secured by appropriate fastening means to an inner mounting plate 31 within the control panel 12. Centrally located on this mounting bracket 26 is a through hole 32 which provides mounting support for the line switch plunger 22. Located on one side of the mounting bracket 26 is a substantially rectangular shaped opening 33, FIGS. 2 and 3, which receives a portion of the unbalance lever 29.

The line switch plunger 22, as shown in FIG. 2, is generally rod shaped with its main plunger portion 34 being rotatably and slideably mounted in the through hole 32 of the mounting bracket 26. The plunger 22 has a spherical nose 35 for engaging with the rear of the access door 20. The plunger 22 extends rearwardly to a point where it branches out in a "T" shape with a first branch 36 of the "T" having a forward tapered rear surface 39 as best shown in FIG. 3. When this forward tapered surface 39 is aligned with the line switch button 40 as in FIG. 4, the line switch 24 will be closed by the line switch plunger 22 as the access door 20 is closed. The second branch 41 of the "T" extends rearward and downward as in FIGS. 2, 3 and 4 for cooperation with a cam portion 42 as in FIG. 6 of the manually operated brake control 25 which will be further discussed.

As best shown in FIG. 2 and located forward of the tapered surface 39, is a portion of the plunger 22 which includes an upwardly extending tab 44 having a rectangular opening 45 for receiving an arm portion 46 of the unbalance lever 29. This rectangular tab opening 45 is generally aligned with the rectangular opening 33 in the mounting bracket 26.

As best shown in FIG. 3, the unbalance lever 29 is mounted in the rectangular opening 33 in the mounting bracket 26. The unbalance lever 29 has an "S" shape in its center portion with an upwardly extending arm portion 46 for extending through the tab opening 45 in the plunger 22. The bottom of the mounting bracket 26 includes a rib section 49 which pivotally engages the first section of the "S" curve of the unbalance lever. The unbalance lever 29 is captured between the rib 49 of the mounting bracket 26 and the inner mounting plate 31. A downwardly extending tab portion 50 of the unbalance lever 29 extends toward a position adjacent the bumper 16 on the tub cover 15.

The rear of the mounting bracket 26 on the side opposite the rectangular opening 33 has a tab 51 with a hole 52 for receiving one hook end of a biasing spring 30. The other end of the biasing spring 30 is secured in a hole 54 located in the second branch 41 of the line switch plunger 22 which extends rearward toward the brake control 25. This spring 30 biases the plunger 22 toward the mounting bracket 26 and the access door 20 so that the forward tapered surface 39 of the plunger 22 will readily disengage the switch button 40 when the access door 20 is open.

As shown in FIGS. 2 and 5, the line switch 24 is mounted on a bracket 55 which in turn is mounted to the same inner mounting plate 31 as the actuator mechanism 23. This switch 24 is connected into the electrical circuit such that the automatic washing machine 10 cannot be run through the predetermined cycle of operations unless the switch 24 is closed.

Referring to FIGS. 1, 2, and also FIGS. 6 through 9, there is shown a manually operated caster brake control 25. As shown in FIG. 1, the washing machine 10 is supported on casters at all four corners. The front casters 56 are of the castering or swivelling type while the rear casters 59 are of the noncastering or nonswivelling type.

FIGS. 6 and 7 show that the rear casters 59 are lockable against rolling. The caster wheels 56 and 59 are molded from a resilient material. A metal hub 60 having cogged or toothed rim 61 is pressed into the molded rear wheels 59. This caster assembly is then secured to a caster mounting bracket 62 on a shaft 63 which is staked at each end.

A brake arm 64 is pivotally mounted on a pin 65 within the caster mounting bracket 62 as best shown in FIGS. 7 and 9. The brake arm 64 has an inverted channel shape with one downturned wall 66 of the channel having two teeth 69 formed in it. These teeth 69 conform substantially to the shape of the cogs on the rim 61 of the hub and are operable for engaging therewith. The center section of the end of the brake arm 64 opposite the pivot end has a notch 70 for receiving the spherical end fitting 71 of an actuating cable 72.

As shown in FIGS. 6 and 7, the brake arm 64 is biased toward the caster wheel hub 60 by a torsion spring 73 which is wound around the brake arm pivot pin 65 and is captured within the caster mounting bracket 62.

FIGS. 1 through 4 show the operating knob 74 of the manually operated brake control 25. The brake control 25 has two positions, "brake on" and "brake off."

As shown in FIGS. 6 and 8, a control mounting plate 75 is secured to the inside rear of the automatic washer cabinet 11 by appropriate threaded fasteners 76. This control mounting plate 75 is generally rectangular in shape with first and second stop tabs 79 and 80 and a spring mounting tab 81 lanced out of the sheet metal. These tabs 79 – 81 will be further discussed hereinafter.

Rotatably mounted to the plate from the inside of the machine 10 and best shown in FIGS. 3 and 4 is a shaft arm assembly 82 having two shafts mounted on a sheet metal plate 83. A double-D shaft 84 is staked to one side of the mounting plate 83 and protrudes through the rear of the cabinet 11. The portion of the double-D shaft 84 which protrudes through the cabinet 11 mounts the operating knob 74. This shaft arm assembly 82 is secured to the control mounting plate 75 by a snap ring (not shown) and is free to rotate between the stop tabs 79 and 80 with manipulation of the operating knob 74. Located eccentrically from the double-D shaft 84 is a cam surface 42 as shown in FIGS. 3, 4 and 6. This cam surface 42 has a radiused leading edge and is formed from the sheet metal shaft mounting plate 83. A second shaft 85 is staked to the mounting plate 83 in the opposite direction from the double-D shaft 84 and is also located eccentrically from the double-D shaft 84.

As best shown in FIGS. 6 and 8, a molded thermoplastic triangular shaped guide block 86 is mounted on the second shaft 85. This guide block 86 is free to rotate about the second shaft 85 and is grooved to accept and guide the actuating cable 72. A spring biased retaining clip 89 slips into a groove 90 in the second shaft 85 and prevents the guide block 86 from being removed from the shaft 85. A biasing spring 91 extends from this clip 89 to the spring mounting tab 81 on the mounting plate 75 and serves to bias the guide block 86 and shaft arm assembly 82 overcenter towards the stops 79 and 80 as the operating knob 74 is moved between the "brake on" and "brake off" positions.

FIGS. 6 and 8 show a slider block or cornering guide 92 in the upper corner of the cabinet 11. These blocks 92 are molded of a thermoplastic material and are generally triangular in shape. The upper portion of the block 92 has an arcuately shaped groove 93 which serves as a cable guide. At each end of the groove 93, a peg 94 is molded to retain the cable 72 within the groove 93. The side of the block 92 opposite the arcuate groove 93 has a molded pin and a cored hole (not shown). This pin and hole line up with a hole and arcuate slot, respectively, in the rear of the cabinet 11; a suitable threaded fastener is tapped into the cored hole and the slider block 92 can pivot about the pin to provide adjustability to the actuating cable 72.

FIGS. 6 through 9 also show the routing of the actuating cable 72. The actuating cable 72 is coated with a plastic material to prevent excessive wear on the cornering guides 92 and guide block 86. This cable 72 has spherical end connections 71 which are crimped to the cable 72 as shown in FIGS. 7 and 9. The cable 72 is routed from the notch 70 of one brake arm 64 upward to a first slider block or cornering guide 92. From the first cornering guide 92, the cable 72 is routed to the guide block 86 and then to a second cornering guide 92 and downward to the notch 70 of the other brake arm 64. The second cornering guide 92 and brake arm 64 are not shown. However, it is to be understood that both rear casters 59 of the preferred embodiment do employ a brake.

FIGS. 6 and 7 show the manually operated brake control 25 in the "on" position. When the operating knob 74 shown in FIG. 2 is in the "brake on" position, the shaft arm asembly 82 has been rotated to the position as shown in FIG. 6 and against the first stop tab 79 of the mounting plate 75. In this position, the guide block 86 is rotated to the position of FIG. 6 which allows slack in the actuating cable 72. Slack in the cable 72 enables the torsion springs 73 associated with the brake arms 64 to bias the brake arms 64 into engagement with the cogs of the caster wheel hubs 60. The cam surface 42 of the shaft arm assembly 82 engages with the downwardly extending portion 95 of the line switch plunger 22 and raises it as shown in FIG. 6. Raising of this downwardly extending portion 95 of the line switch plunger 22 aligns the forwardly tapered surface 39 with the line switch button 40 as shown in FIG. 4. In this position, when the access door 20 is closed, the rear of the door 20 will move the line switch plunger 22 rearwardly and the tapered surface 39 will contact the button 40 and close the switch 24 to initiate operation of the washing machine 10.

FIGS. 8 and 9 show the manually operated brake control 25 in the "off" position. With the operating knob 74 in the "brake off" position, the shaft arm assembly 82 has been moved to a position against the second stop tab 80 as shown in FIG. 8. In this position, the guide block 86 has picked up the cable slack and lifted the brake arm teeth 69 out of engagement with the caster hub 60 to a position as shown in FIG. 9. In this position, the cam surface 42 of the shaft assembly 82 has been moved out of engagement with the downwardly extending portion 95 of the line switch plunger 22. In this condition, the tapered surface 39 will be positioned as shown in FIG. 3 and when the access door 20 is closed to move the line switch plunger 22 rearward, the tapered surface 39 will not engage with the switch button 40 to close the circuit and the automatic washer 10 will not be activated.

In the event of an unbalance condition, the bumper 16 on the tub cover 15 in FIGS. 2 and 3 will engage the downwardly extending tab portion 50 of the unbalance lever 29. This engagement will cause the arm portion 46 of the unbalance lever 29 to move in the rectangular tab opening 45 and rotate the line switch plunger 22 counterclockwise. This rotation will cause the forwardly tapered surface 39 to move below the switch button 40 and allow the switch button 40 to release, opening the circuit and retaining the tapered surface 39 of the line switch plunger 22 as shown in FIG. 5. Opening the access door 20 to correct the unbalance condition will allow the biasing spring 30 to move the plunger 22 toward the mounting bracket 26 and restore the plunger 22 to the condition of FIG. 4. Reclosing the access door 20 will then reinitiate operation of the washing machine 10.

It is therefore seen that the instant invention provides a novel brake control system. Operation of the portable automatic washing machine 10 is prevented unless the brake system is manually actuated to the "on" position and the access door 20 is closed. Thus, in the case of heavy agitation or braking the washing machine 10 is prevented from moving from a stationary position. This control system also provides means for interrupting a cycle of operations should an extreme unbalance situation develop.

In the drawings and specification there has been set forth a preferred embodiment of the invention and although specific terms are employed these are used in a generic and descriptive sense only and not for purposes of limitation. Changes in the form and the proportion of parts, as well as the substitution of equivalents are contemplated, as circumstances may suggest or render expedient, without departing from the spirit or scope of this invention as defined in the following claims.

I claim:

1. A caster brake control system for a portable apparatus having a plurality of electrical components operable through a series of operations wherein said apparatus includes cabinet means and an access door on said cabinet means movable between a closed position and an open position, the combination comprising: switch means operable between a first condition for deenergizing said apparatus and a second condition for effectively energizing said apparatus; a plurality of casters secured to said cabinet means and including a wheel for engaging a supporting surface; brake means associated with at least one of said casters for effectively locking said wheel against rolling action; a brake control operably connected to said brake means and movable between a brake-disengaged position and a brake-engaged position; and linkage means associated with said access door, said switch means, and said brake control and operable for actuating said switch means from said first condition to said second condition when said brake control is in said brake-engaged position and said access door is in said closed position, said linkage means being inoperable for actuating said switch means from said first condition to said second condition when said brake control is in said brake-disengaged position whereby said portable apparatus is operable through said series of operations only when said brake means is in said brake-engaged position and said access door is in said closed position.

2. A brake control system as described in claim 1 wherein said brake control is manually operable.

3. A brake control system as described in claim 1 wherein said linkage means is misaligned with respect to actuating said switch means when said brake control is in said brake-disengaged position.

4. A brake control system as described in claim 1 wherein said linkage means is responsive to movement of said access door between said open and closed position.

5. A brake control system as described in claim 1 wherein said brake means includes a hub with a cogged rim on said one caster and a pivotally mounted toothed brake arm biased toward said cogged rim for locking engagement therewith.

6. A brake control system as described in claim 1 wherein said brake means and said brake control are operably connected by a cable.

7. A brake control system as described in claim 6 wherein said brake control includes a cable guide block rotatably and eccentrically mounted to allow cable slack when said brake control is in said brake-engaged position and to take up slack when said brake control is in said brake-disengaged position to allow said brake arm to move from an engaged posture to a disengaged posture.

8. A caster brake control system for a portable fabric washing apparatus including a rotatable member and a plurality of electrical components operable through a series of operations wherein said apparatus includes cabinet means and an access door on said cabinet means movable between a closed position and an open position, the combination comprising: switch means operable between a first condition for deenergizing said apparatus and a second condition for effectively energizing said apparatus; a plurality of casters secured to said cabinet means and including a wheel for engaging a supporting surface; brake means associated with at least one of said casters for effectively locking said wheel against rolling action; a manually operable brake control operably connected to said brake means and movable between a brake-disengaged position and a brake-engaged position; linkage means operatively coupling said access door to said switch means and said brake control for actuating said switch means from said first condition to said second condition when said brake control is in said brake-engaged position and said access door is in said closed position; and unbalance means associated with said linkage means, said unbalance means being responsive to a predetermined gyration of said rotatable member to displace said linkage means a predetermined distance with respect to said switch means to operate said switch means from said second condition to said first condition to interrupt said series of operations.

9. Unbalance means as defined in claim 8 wherein said linkage means is resettable to a position for operating said switch means to said second condition upon opening and reclosing said access door.

10. A caster brake control system for a portable automatic washing machine having a plurality of electrical components operable through a series of operations under control of sequential control means wherein said washing machine includes cabinet means and an access door on said cabinet means movable between an open and a closed position, the combination comprising: switch means operable for opening or closing an electrical circuit in response to the position of said access door; a plurality of casters secured to the bottom of said cabinet means to provide said portability; brake means associated with at least one of said casters including a caster hub with a cogged rim, said brake means further including a toothed brake arm biased toward said cogged rim for locking engagement therewith, a manually operable brake control operably connected to said brake arm through a cable and movable between a brake-disengaged position and a brake-engaged position, said brake control further including means to allow slack in said cable when said control is in said brake-engaged position and to take up slack when said brake control is in said brake-disengaged position; and linkage means operatively coupling said access door to said switch means and said brake control including a switch operating portion and further including means for moving said switch operating portion into operative alignment with said switch means to cause said electrical circuit to initiate operation of said sequential control means when said brake control is in said brake-engaged position and said access door is in said closed position, said switch operating portion being operatively misaligned with respect to said switch means when said brake control is in said brake-disengaged position and said access door is in either said open or closed position, whereby said portable washing machine is operable through said series of operations only when said brake means is in said brake-engaged position and said access door is in said closed position.

11. A brake control system as described in claim 10 wherein said linkage means further includes a plunger having a first portion in communication with said access door and a second portion in communication with said brake control.

12. A brake control system as described in claim 11 wherein said brake control includes a cam for engaging with said second portion of said linkage means to move said switch operating portion of said linkage means into operative alignment with said switch means when said brake control is in said brake-engaged position.

13. A brake control system as described in claim 12 wherein when said brake control is in said brake-disengaged position said cam is disengaged from said linkage means permitting said misalignment with said switch means.

* * * * *